July 20, 1937.   P. R. DRENNING   2,087,471
SIX-WHEEL TRUCK WITH SIDE BEARING ROCKERS
Original Filed Jan. 19, 1931   3 Sheets-Sheet 1
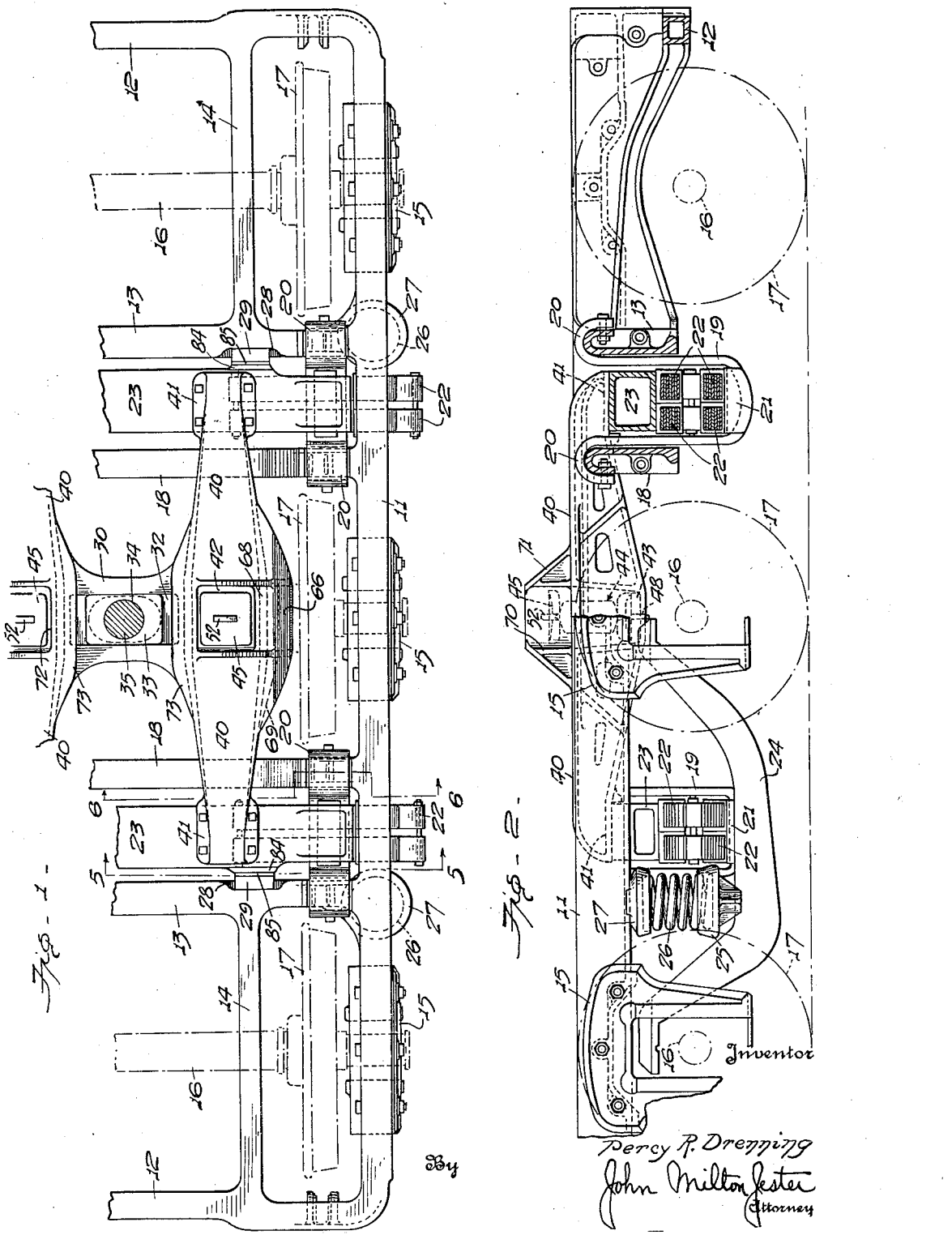

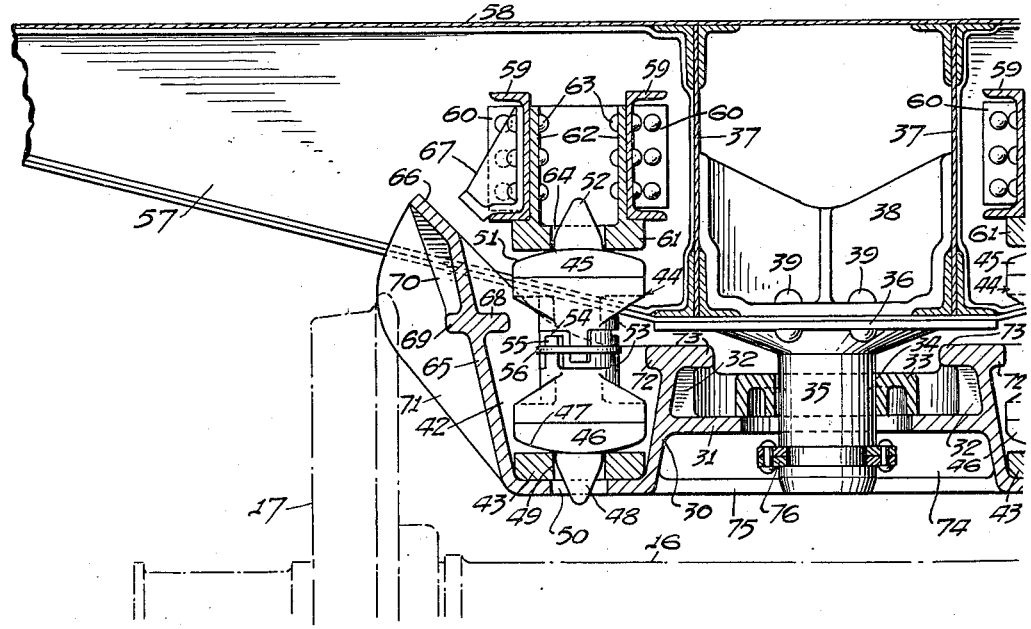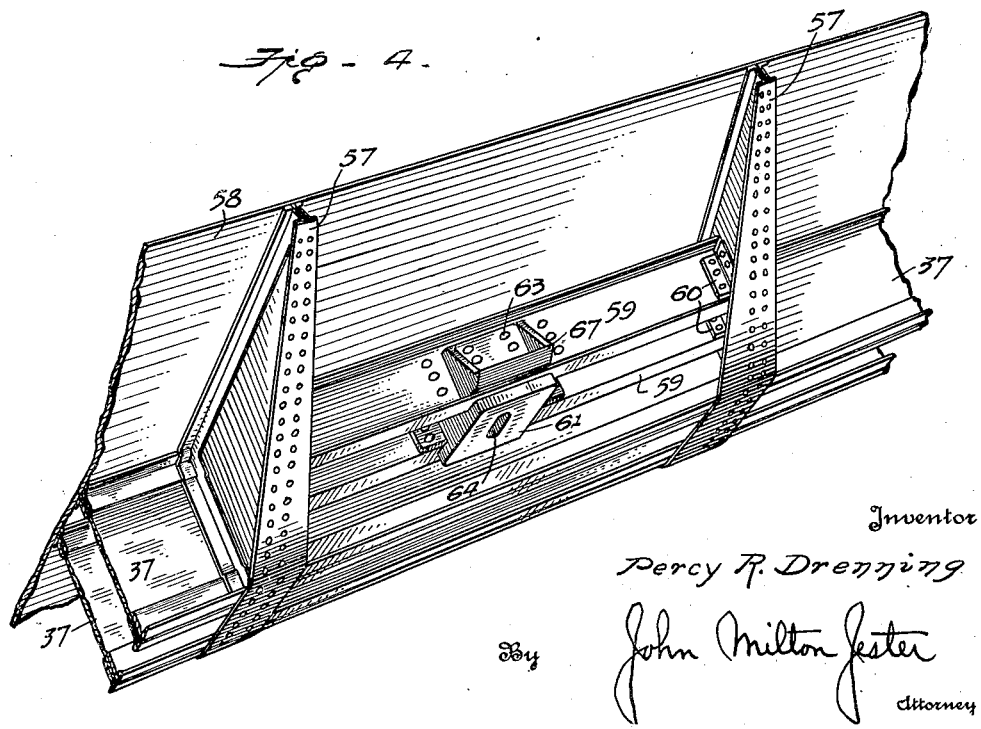

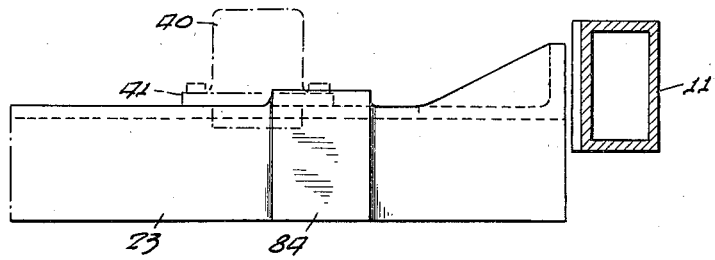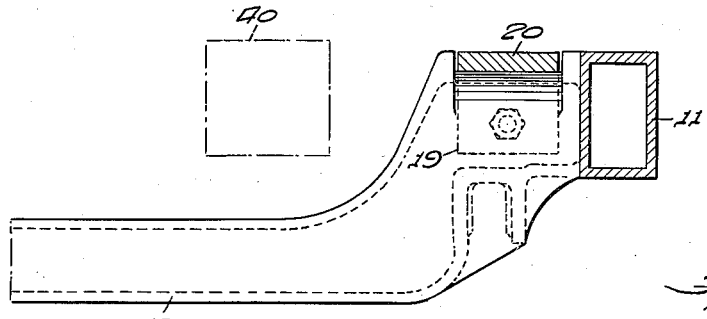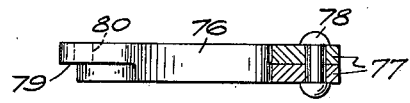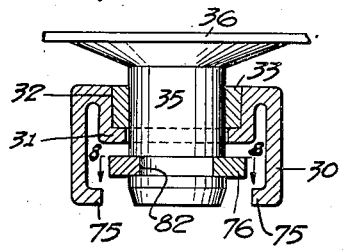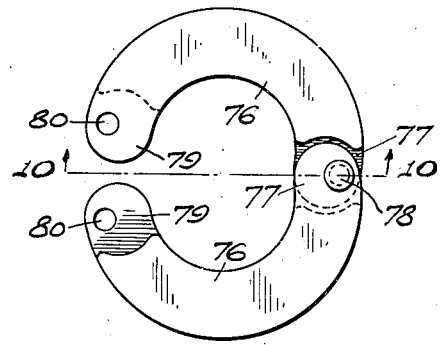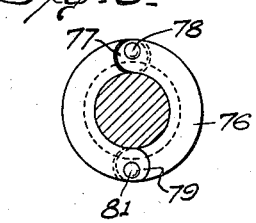

Patented July 20, 1937

2,087,471

UNITED STATES PATENT OFFICE 2,087,471

SIX-WHEEL TRUCK WITH SIDE BEARING ROCKERS

Percy R. Drenning, Baltimore, Md., assignor to T. H. Symington & Son, Inc., Baltimore, Md., a corporation of Maryland Application January 19, 1931, Serial No. 509,826
Renewed May 21, 1932

38 Claims. (Cl. 105—195)

The invention relates to railway car trucks, particularly to those of the type, namely six wheel, intended for use in connection with passenger cars.

The principal object of the invention, generally stated, is to provide means for converting a standard type of six wheel passenger truck into one of the lateral motion permitting side bearing rocker type.

It is well known that the usual type of six wheel truck for passenger cars embodies side bearing means in the nature of block-like elements carried by the truck outwardly of the side frames and engaging members on the car underframe for the purpose of preventing lateral sway or undue movement of any kind and giving stability to the car body. It has been discovered in connection with freight car trucks that it is highly advantageous to permit lateral motion of body bolster with respect to the truck bolster aside from or simultaneously with, frequently the latter, relative swiveling movement of the truck and body bolsters, together with, usually, a greater lifting effect on the outer end of the body bolster than at the inner end so as to neutralize or counteract the effect of centrifugal force developed when the car rounds a curve or passes over a cross-over, thereby preventing any tendency toward the development of car roll and side sway.

It is in view of the above situation and particularly on account of the benefits of lateral motion side bearing rocker means as applied to freight car trucks that I have devised the present invention which contemplates an adaptation or modification of the standard type of six wheel truck to accomplish the same results for passenger cars so that the riding qualities thereof will be improved and shocks, jars or deleterious impacts to the mechanism prevented.

An important object of the invention is to provide a railway car truck of the six wheel type embodying a specially constructed central member or bolster replacing the standard or usual variety and having means for pivotally and slidably connecting therewith the depending center plate carried by the body bolster or car underframe, the replacement bolster being, moreover, equipped with side bearing rocker means located inwardly of the side frames.

A further object of the invention is to provide a six wheel truck possessing the above pointed out characteristics and equipped with means for taking the end thrusts which come longitudinally of the car, an adjustment being provided in connection with this thrust means for taking up wear and preventing the development of any undesired looseness between co-acting parts.

Another object of the invention is to modify or add to the car underframe construction to provide depending bearing elements thereon for cooperation with the side bearing rockers in the truck bolster.

Still another object is to provide a truck construction in which the replacement truck bolster and the depending bearing elements carried by the car underframe are equipped with mutually acting stop members which will operate to catch and limit the movement of the car body with respect to the truck in the event of a possible excess movement or lateral shifting of the body bolster with respect to the truck, that is to say lateral motion, these stop members constituting a safety factor which will probably, however, but rarely come into active service, and then only under unusual circumstances.

A still further object of the invention is to provide a truck assembly and replacement parts therefor embodying side bearing rockers restrained against any movement other than rocking with respect to the elements engaged thereby but which are yet of such construction that the parts thereof are capable of relative torsional movement, the rockers being, moreover, so shaped, as regards their bearing surfaces, as to produce a lifting effect on the body bolster upon the occurrence of lateral motion thereof, the lifting effect being unequal at both sides of the center of the truck so that gravity may act to restore the parts to normal position upon a cessation of whatever force tends to produce the lateral motion.

A more specific object of the invention is the provision of a replacement assembly for a standard truck embodying side bearing rocker means which may be constructed in somewhat the same manner as disclosed in the co-pending application of Thomas H. Symington for patent for Railway car trucks, filed July 30, 1930, Serial No. 471,842, and possessing, of course, the same advantageous features.

An additional object of the invention is to provide an arrangement or structure of this character which will be comparatively simple and inexpensive to make, easy to apply or assemble, positive in action, efficient and durable in service, and a general improvement in the art.

To the attainment of the foregoing and other objects and advantages, the invention preferably consists in the detailed construction and the arrangement and combination of parts to be hereinafter more fully described and claimed, and illustrated in the accompanying drawings in which:

Figure 1 is a plan view of substantially one-half of a six wheel truck embodying my invention, the king pin being shown in section, Figure 2 is a side elevation thereof with parts broken away and in section, Figure 3 is a vertical central cross-sectional view, Figure 4 is a fragmentary perspective view looking at the underside of the car underframe and showing the additions thereto involved in carrying out my invention.

Figure 5 is a vertical cross-sectional view taken on the line 5—5 of Figure 1 and looking in the direction of the arrows, Figure 6 is a similar view taken on the line 6—6 of Figure 1, Figure 7 is a detail cross-sectional view taken at the center plate and bearing arrangement, Figure 8 is a detail cross-section on the line 8—8 of Figure 7, Figure 9 is a plan view of what is shown in Figure 8 but with the parts separated ready for application, to the center plate, and Figure 10 is a cross-sectional view taken on the line 10—10 of Figure 9.

Referring more particularly to the drawings, the numeral 11 designates the side frames or side frame portions of a six wheel truck frame which is in most respects, or at least except as hereinafter pointed out, of the general or standard construction in which the side frames are connected by end frame members 12 and intermediate transverse frame members 13, the members 12 and 13 being in turn connected by longitudinally extending elements 14. The side frames carry pedestals 15 within which are mounted the usual journal boxes, not shown, having the customary bearing means for the axles 16 which carry the wheels 17. The axles 16 and 17 are indicated by dot and dash lines as they constitute no real part of the present invention. Suitably connected with the side frames, or formed integrally therewith, as may be desired, are cross bearers or frame members 18 spaced inwardly from the members 13. The numeral 19 designates hangers or stirrups of U-form which have their upper ends outwardly extended or hooked at 20, and engaged over and secured to the upper portions of the members 13 and 18. Seat elements 21 are located within the bight portions of the hangers 19 and support elliptic springs 22 which in turn carry bolsters 23 which constitute the means to which is attached the replacement assembly constituting the subject-matter of my invention.

The numeral 24 designates the usual equalizers mounted in the customary manner and carrying spring seats 25 supporting springs 26 of the helical type on which are mounted caps 27 engaging beneath the side frame portions 11.

Before passing to a detailed description of the improvements, it may be well to mention that the transverse frame members 13 are formed with recesses or pockets 28 within which are chafing or wear blocks 29, the purpose of which will be hereinafter more fully explained.

In carrying out my invention I provide a replacement assembly all the supporting portion of which may be and preferably is constructed as a single casting of appropriate dimensions depending upon the detailed formation of the truck frame to which it is intended to be applied.

This replacement assembly is here disclosed as comprising a central truck bolster body member 30 having its central portion formed with a depressed wall or floor member 31 defining a recess 32 constituting a guide for a center bearing block 33 having a central opening 34 therein rotatably receiving a king pin 35 depending from a plate element 36 secured to the underside of the center sills 37 of the car underframe, there being, as is usual, a reinforcing casting 38 secured between the center sills and constituting means to which the plate 36 is secured as for example by rivets 39. The precise construction of the casting 38 is more or less immaterial as its function is simply to strengthen the structure at the point where the king pin is attached.

The center bolster is of H-shape, that is to say its end portions are formed with laterally extended arms 40 terminating in attaching portions 41 which are bolted or otherwise suitably secured to the cross bolsters 23. The end portions of the center bolster are formed at or between the laterally extended arms at each side or end thereof with pockets 42 within the bottom of which are bearing blocks or plates 43 which support the side bearing rocker assemblies indicated as a whole by the numeral 44. Although these assemblies are discussed in every respect in the co-pending application above referred to, it may be well, for the sake of clearness, to give a detailed description thereof herein. Such being the case I will explain that each of these assemblies includes upper and lower bearing members 45 and 46, respectively, which are preferably counterparts or identical in construction but arranged in reverse relation. The lower member 46 has a curved bottom surface 47 for co-action and rolling engagement longitudinally of the center bolster with the bearing block or plate 43, there being provided at the center of this curved surface a depending spud 48 extending through an opening 49 in the block 43 and through an opening 51 in the bottom of the pocket, the latter mentioned opening being for the purpose of permitting the escape of any water or foreign matter which might otherwise accumulate within the pocket. It is intended that the spud 48 and the opening 49 be of such cross-sectional shape and that the spud be of such general shape in side and end elevation as to permit the member 46 to rock longitudinally of the bolster while movement in any other direction will be prevented. The upper bearing member 45 has a convex cylindrical surface 51 adapted to cooperate with bearing means to be described carried by the car underframe. Furthermore, there is provided a spud 52 corresponding to the spud 48 projecting upwardly from the center of this surface 51. The reason will become apparent later. The bearing members 45 and 46 are both formed with cylindrical extensions 53 extending toward each other and of hollow formation, the end portions or adjacent ends being provided with interfitting recesses and tongues 54 and 55, respectively, peripherally grooved for the reception of a split retaining ring 56 exactly as in said co-pending application. Within the interior of the extensions 53 it is intended that there be provided hardened bearing blocks which are not shown in the present instance as they are so clearly illustrated in said application. The purpose of this detailed construction within each side bearing assembly is to permit the upper bearing member 45 to rock transversely of the car body and to permit the lower bearing member 46 to rock longitudinally of the truck bolster, any torsional movement between these members being permissible by virtue of the provision of the hardened bearing blocks which take the load. The inter-fitting tongues and grooves and the retaining ring about the former are simply for the purpose of defining cages for the hardened bearing blocks so that they cannot become displaced.

To equip or modify the car underframe in such manner that there will be bearing means for cooperation with the side bearing rocker assemblies, it is necessary that certain elements be added to what already exists in the standard construction. It is common practice to provide cross bearers 57 which extend transversely beneath the car and which are secured to the center sills 37, there also being provided a sheet or plate 58 secured upon the top of the sills and cross bearers. In accordance with my invention I provide beams or bars 59 of suitable cross-sectional configuration, but preferably channel beams, extending longitudinally of the underframe between the two cross bearers at opposite sides of the axis of the truck, these members 59 being suitably secured to these cross bearers as by brackets 60. Located between the bars 59 and extending therebelow are bearing members 61 which have upstanding plate portions 62 riveted or otherwise suitably secured at 63 to the confronting sides of the members 59. These members 61 constitute bearing means carried by the car for cooperation with the upper bearing members 55 of the rocker assemblies and they are formed with central openings 64 for the reception of the upstanding spuds 52 above described, the shape of the spuds and the openings being such that movement of the members 45 will be limited to a rocking or rolling motion transversely of the car body.

In side bearing rocker devices there is naturally a possibility of an over-throw or excessive movement of the car body laterally of the truck and track when the car passes around a curve or over a cross-over, particularly if there should happen to be a noticeable dip in the track or if there should be an insufficient elevation of the outer rail at a curve traveled over by a train running at high speed. As a safety factor I therefore prolong the outer end wall 65 of each pocket upwardly and incline it outwardly to provide an abutment 66 adapted to be engaged by a stop 67 secured upon the outer side of the outermost bar member 59. The abutment 66 and the co-acting face of the stop 67 are shown as having substantially the same inclination so that there will be practically flat contact in case this stop means comes into play.

It is naturally conceivable that there may be considerable variation in the actual details of construction or formation of the replacement H-like truck bolster and it is not intended that I be limited to the precise details disclosed. However, it may be well to mention that the outer wall 65 of each pocket is preferably reinforced at its inner face by a transverse rib 68 and that the outer surface be provided with a similar transverse rib 69 from which leads an upwardly extending web 70 which continues to the upper edge of the safety abutment 66. Moreover, it is advisable to form a relatively large web 71 of convex shape extending from the upper edge of the abutment 66 outwardly and down to the bottom of the pocket. The upper edge of the inner wall of each pocket is preferably formed with an outwardly extending rib or enlargement 72 and also an inwardly extending prolongation 73 partially overlying the recess 32. The sides of the center bolster, indicated at 74, extend clear to the bottom and preferably are strengthened at their lower edges by marginal flanges or ribs 75 projecting toward each other but spaced apart to accommodate the center plate or trunnion-like member 35 which projects downwardly to an appreciable extent below the floor portion 31 upon which the plate or block 33 slides.

In order to prevent or limit upward movement of the car body with respect to the truck in the event of some unforeseen or conceivable condition I prefer to equip the king pin 35 with retaining means here disclosed as comprising a pair of semi-ring members 76 cut away at one end for half their thickness to define interfitting ears 77 pivotally connected as by a rivet or the like 78 and having their other ends similarly further cut away, as far as thickness is concerned to define other interfitting ears 79 apertured at 80 for the reception of a securing element 81. These semi-ring members, when assembled, constitute a collar which fits within the peripheral groove 82 in the lower portion of the king pin or trunnion element 35, as clearly indicated in Figure 7. Before leaving the description of this portion of the mechanism it may probably be well to state that the floor or wall member 31 of the recess 32 is formed with an elongated slot 83 extending transversely of the truck so as to enable the center plate or trunnion member 35 to move freely when lateral motion of the car body with respect to the truck takes place.

In a construction of this character it is quite apparent that there is certain to be a thrust exerted longitudinally of the car against the truck frame during train movement and to provide for this and avoid undue shock and jar to the parts, the cross bolsters 23 are represented as provided at their outer faces with bearing portions or members 84 opposite the chafing blocks 29 which are seated within the above described pockets or recesses 28. Shims 85, held in place by any desired means whatsoever, may be inserted between the blocks 29 and bearing members 84 to take the thrust, it being certainly preferable to eliminate any play at these points. In case of wear such shims may be replaced by thicker ones or additional ones may be inserted, this being a mechanical detail capable of ready comprehension without elaboration.

In the operation it will be seen that when relative swiveling movement of the car body and truck takes place the king pin or trunnion member 35 will simply rotate within the opening 34 in the slide block 33. At such a time, as the upper bearing member 45 is limited to rocking movement transversely of the car body and as the lower bearing member 46 is limited to similar movement longitudinally of the truck bolster there will necessarily be a rotation or twisting movement between the members 45 and 46, this being easily permitted by virtue of the provision of the hardened blocks confined within the cages defined by the interfitting tongues and retaining ring 56.

When lateral motion occurs it is clear that the side bearing assemblies 34 will rock bodily, the curved surface 47 of each lower bearing member 46 rolling upon the top of the bearing plate or block 43 and the curved upper surface 51 of the upper bearing member 45 rolling against the flat undersurface of the bearing member 61 carried by the car underframe.

There is no torsional relative movement of the bearing members 45 and 46 unless the lateral motion be accompanied by relative swiveling movement of the body and truck. In this latter mentioned instance there is the same rocking motion described above, together with a relative torsional movement of the upper and lower bearing members of the side bearing assemblies. In the present instance there is no specific detailed description given regarding the exact curvature of the surfaces 47 and 51 but by referring to said co-pending application above identified it will be understood that this curvature is preferably such that when lateral motion occurs the car body will be elevated bodily with respect to the truck, the lift at the outer end of the truck, that is to say the end toward which forces move the car bodily, being greater than at the inner end. This differential action will enable gravity to restore the parts to their normal position upon the cessation of whatever force has operated to effect lateral motion.

Attention is directed to the feature that by providing my H-shaped assembly a six wheel truck of the ordinary type may be converted into one capable of lateral motion and equipped with side bearing rocker assemblies in lieu of the block-line side bearing ordinarily provided which are located outwardly of the side frames. As a consequence it is easily possible not only to improve the riding qualities of the car but also to reduce to the minimum strains upon the parts resulting from shocks and jars so that the entire truck should have a much longer life and be less subject to wear than is ordinarily the case. Of course there is no particular restriction as to my device being incorporated in an already existing truck as it is a simple matter to build it into new equipment though naturally less expense would be involved in the first mentioned instance.

From the foregoing description and a study of the drawings it is thought that the construction, operation and advantages should be readily apparent to one skilled in the art without further explanation.

While I have shown and described the preferred embodiment of the invention it should be distinctly understood that the disclosure is merely illustrative of the general principles involved and that various changes and modification may be resorted to to improve or increase the adaptability and efficiency provided such variations constitute no departure from the salient features of the invention or the scope of the claims hereunto appended.

Having thus described my invention, what I claim is:

1. In a railway car truck including side frames and spring supported cross bolsters, a center bolster of substantially H-shape provided with bearing means for a king pin and having arms connected with said cross bolsters, said center bolster supporting side bearing rocker means.

2. In a railway car truck including side frames and spring supported cross bolsters, a center bolster of substantially H-shape provided with bearing means for a king pin and having arms connected with said cross bolsters, said center bolster supporting side bearing rocker means, said bearing means being slidable longitudinally of the center bolster and transversely of the truck.

3. In a railway car truck including side frames and cross bolsters, the latter being spring supported, a substantially H-shaped center bolster carrying side bearing rockers and having its intermediate portion provided with a transversely slidable center bearing adapted to receive a king pin and having its end portions formed with arms secured to said cross bolsters.

4. In a railway car truck of the six wheel type, side frames, transverse bar elements connecting the same, spaced cross bolsters, spring means supporting the cross bolsters, a center bolster of substantially H-shape carrying side bearing rockers and provided at its ends with arms secured to said cross bolsters and provided at its center with a guide, and a bearing member slidable along said guide transversely of the truck and adapted to revolubly receive the depending king pin of a car body.

5. In a railway car truck, side frames connected at spaced points by transverse bar members, cross bolsters arranged in spaced relation at opposite sides of the center of the truck and mounted upon resilient supporting means, and a center bolster having its opposite sides mounted upon and secured to said cross bolsters and provided centrally with a bearing slidable transversely of the truck and adapted to receive the depending king pin of a car body, and side bearing means carried by said center bolster.

6. In a railway car truck, side frames connected at spaced points by transverse bar members, cross bolsters arranged in spaced relation at opposite sides of the center of the truck and mounted upon resilient supporting means, and a center bolster having its opposite sides mounted upon and secured to said cross bolsters and provided centrally with a bearing slidable transversely of the truck and adapted to receive the depending king pin of a car body, and side bearing rockers carried by said center bolster adapted to support a body bolster.

7. In a railway car truck, side frames, transverse frame elements connecting the same, cross bolsters spring supported between the side frames, a center bolster provided at its ends with means secured to said cross bolsters and provided centrally with laterally movable bearing means, and side bearing rockers mounted in said center bolster.

8. In a railway car truck, side frames connected by transverse elements, resiliently supported cross bolsters mounted in spaced relation within the truck, a center bolster provided at its end portions with means mounted upon the cross bolsters and provided centrally with a guide, a bearing member slidable within said guide laterally of the truck, said center bolster being formed near its ends with pockets, and side bearing means mounted within said pockets.

9. In a railway car truck, side frames connected by transverse elements, resiliently supported cross bolsters mounted in spaced relation within the truck, a center bolster provided at its end portions with means mounted upon the cross bolsters and provided centrally with a guide, a bearing member slidable within said guide laterally of the truck, said center bolster being formed near its ends with pockets, and side bearing means mounted within said pockets and formed as rockers.

10. In a railway car truck, side frames connected by transverse elements, resiliently supported cross bolsters mounted in spaced relation within the truck, a center bolster provided at its end portions with means mounted upon the cross bolsters and provided centrally with a guide, a bearing member slidable within said guide laterally of the truck, said center bolster being formed near its ends with pockets, and side bearing means mounted within said pockets and formed as rockers embodying upper and lower convexly curved bearing members and torsion permitting means connecting the same.

11. In a railway car truck, side frames, transverse elements connecting the same, spring supported cross bolsters extending between the side frames, a substantially H-shaped center bolster having its ends provided with laterally extending portions secured upon said cross bolsters and having its intermediate portion provided with a bearing slidably and guidably mounted for movement transversely of the truck, the end portions of said center bolster being formed with pockets, and side bearing assemblies located within said pockets, each rocker including upper and lower bearing members having their adjacent portions arranged in interfitting engagement and containing bearing elements enabling the upper and lower bearing members to have torsional relative movement.

12. In a railway car truck comprising side frames and upper, intermediate and inner transverse members connecting the same, cross bolsters spring supported and located between said inner and intermediate transverse members, a centrally arranged substantially H-shaped center bolster provided at its ends with oppositely extending arms secured to said cross bolsters and having its center provided with a transversely slidable bearing means adapted to receive a king pin depending from a car body, side bearing means on the opposite ends of said center bolster for additionally supporting a body bolster, and thrust take-up means between said cross bolsters and said intermediate transverse members.

13. In a railway car truck comprising side frames and upper, intermediate and inner transverse members connecting the same, cross bolsters spring supported and located between said inner and intermediate transverse members, a centrally arranged substantially H-shaped center bolster provided at its ends with oppositely extending arms secured to said cross bolsters and having its center provided with a transversely slidable bearing means adapted to receive a center plate depending from a car body, side bearing means on the opposite ends of said center bolster for additionally supporting a body bolster, and thrust take-up means between said cross bolsters and said intermediate transverse members comprising chafing plates carried by the cross bolsters, and wear blocks removably mounted in said intermediate transverse members.

14. In a railway car truck comprising side frames and upper, intermediate and inner transverse members connecting the same, cross bolsters spring supported and located between said inner and intermediate transverse members, a centrally arranged substantially H-shaped center bolster provided at its ends with oppositely extending arms secured to said cross bolsters and having its center provided with a transversely slidable bearing means adapted to receive a king pin depending from a car body, side bearing means on the opposite ends of said center bolster for additionally supporting a body bolster, and thrust take-up means between said cross bolsters and said intermediate transverse members comprising chafing plates carried by the outer faces of said cross bolsters, wear blocks seated within pockets in the inner faces of said intermediate transverse members, and shims interposed between said wear blocks and said chafing plates.

15. In a railway car truck, side frames, outer, intermediate and inner transverse members connecting the same, cross bolsters spring supported from and located between said intermediate and inner transverse members, a center bolster of substantially H-shape located between said inner transverse members and having its ends provided with lateral arms secured upon said cross bolsters, bearing means guidably slidable at the central portion of said center bolster and movable transversely of the truck, the end portions of said center bolster being formed with pockets and side bearing rockers located within said pockets.

16. In a railway car truck, side frames, outer, intermediate and inner transverse members connecting the same, a cross bolster spring supported from and located between said intermediate and inner transverse members, a center bolster of substantially H-shape located between said inner transverse members and having its ends provided with lateral arms secured upon said cross bolsters, bearing means guidably slidable at the central portion of said center bolster and movable transversely of the truck, the end portions of said center bolster being formed with pockets and side bearing rockers located within said pockets, said side bearing rockers including upper and lower members, the latter of which is constrained against movement other than longitudinally of the center bolster, and both of which are torsionally connected.

17. In a railway car truck, side frames connected by transverse members located at the outer ends, the intermediate portions and toward the center, cross bolsters located between certain of said transverse members, stirrups carried by certain of said transverse members and carrying resilient means supporting the cross bolsters, a centrally located center bolster having lateral extensions engaged upon said cross bolsters, said center bolster being formed at its center with a guide, a bearing plate slidable within said guide transversely of the bolster and cylindrically apertured for the reception of a center plate, the end portions of said center bolster being formed with pockets and a rocker assembly mounted within each of said pockets.

18. In a railway car truck, side frames connected by transverse members located at the outer ends, the intermediate portions and toward the center, cross bolsters located between certain of said transverse members, stirrups carried by certain of said transverse members and carrying resilient means supporting the cross bolsters, a centrally located center bolster having lateral extensions engaged upon said cross bolsters, said center bolster being formed at its center with a guide, a bearing plate slidable within said guide transversely of the bolster and cylindrically apertured for the reception of a king pin, the end portions of said center bolster being formed with pockets and a rocker assembly mounted within each of said pockets, each rocker assembly comprising upper and lower bearing members with convex surfaces formed with inwardly extending hollow cylindrical portions enclosing bearing block elements.

19. In a railway car truck of the six wheel type employing side frames and transverse members connecting the same, a centrally located bolster resiliently supported and formed centrally with guide means, a king pin bearing member located within said guide means and slidable transversely of the truck, the end portions of said bolster being formed with pockets containing side bearing rockers adapted to support a body bolster.

20. In a railway car truck of the six wheel type embodying side frames and transverse members connecting the same, a centrally located bolster resiliently supported and formed centrally with guide means, a king pin bearing member located within said guide means and slidable transversely of the truck, the end portions of said bolster being formed with pockets containing side bearing rockers adapted to support a body bolster, and thrust take-up means for taking up any thrust of said bolster longitudinally of the truck.

21. In a railway car truck of the six wheel type including side frames, means connecting the same and spring supported cross bolsters, a replacement structure comprising a center bolster mounted upon said cross bolsters, side bearing rockers mounted in said center bolster, and guide means slidably mounted within the center bolster adapted to swively engage a king pin depending from a body bolster, and said side bearing rockers being adapted to support the weight of the body bolster and the load thereon.

22. In a railway truck of the six wheel type, side frames connected with each other, spring supported cross bolsters mounted between the side frames, a center bolster mounted on said cross bolsters and located inwardly of the side frames, said center bolster being formed with pockets, side bearing rockers mounted within said pockets, a body bolster equipped centrally with a depending trunnion member, means on the center bolster providing a sliding and pivotal mounting for said trunnion member, and bearing members on the body bolster supported upon said side bearing rockers.

23. In a railway truck of the six wheel type, side frames connected with each other, spring supported cross bolsters mounted between the side frames, a center bolster mounted on said cross bolsters and located inwardly of the side frames, said center bolster being formed with pockets, side bearing rockers mounted within said pockets, a body bolster equipped centrally with a depending trunnion member, means on the center bolster providing a sliding and pivotal mounting for said trunnion member, bearing members on the body bolster supported upon said side bearing rockers, and coacting stops on the center bolster and body bolster engageable upon excessive lateral rocking of said side bearing rockers.

24. In a railway car truck of the six wheel type including side frames, means connecting the same and spring supported cross bolsters, a replacement structure comprising a center bolster mounted upon said cross bolsters, side bearing rockers mounted in said center bolster, and guide means located within the center bolster adapted to rotatably engage a king pin depending from a body bolster, and said side bearing rockers being adapted to support the weight of the body bolster and the load thereon, said side bearing rockers being formed of swively connected parts.

25. Means for converting a six wheel truck of the swing link lateral motion type into one of the lateral motion rocker type, the truck including side frames connected with each other, spring supported cross bolsters, and a body bolster having a depending trunnion; said converting means comprising a center bolster mounted upon said cross bolsters and located inwardly of said side frames, pockets formed on the center bolster, a slidable and pivotal mounting on the center bolster for said trunnion, side bearing rockers within said pockets, bearings carried by the body bolster and engaged upon said side bearing rockers, and rigid supports for the bolster supporting springs replacing the usual swing links.

26. A replacement bolster comprising a center bolster containing slidable and rotatable guide means and side bearing rockers, said bolster having arms adapted to be mounted upon the spaced cross bolsters of a six wheel truck for supporting a car body bolster and enabling the latter to have lateral motion with respect to the truck.

27. In a railway truck of the six wheel type, side frames, spring supported cross bolsters, a body bolster having a depending trunnion and depending side bearing elements, and a center bolster mounted upon said cross bolsters and having a slidable and rotatable mounting at its center for connection with said depending trunnion, said center bolster further having side bearing rockers located inwardly of the side frames and cooperating with the depending bearing elements on the body bolster for sustaining the load.

28. Means for converting a swing link lateral motion six wheel truck into a truck of the lateral motion rocker type, the truck including side frames and spring supported cross bolsters, said converting means comprising a replacement center bolster to be mounted upon said cross bolsters and formed with pockets located inwardly of its ends, side bearing rockers within said pockets adapted to cooperate with and support the body bolster, and a slidable and pivotal means at the center of said center bolster adapted for connection with the body bolster, said converting means further including rigid supporting stirrups for the springs supporting the cross bolsters.

29. In combination with a truck of the six wheel type having cross bolsters, a center bolster adapted to be secured upon the cross bolsters and having self-contained side bearing rocker means adapted to support a body bolster for sustaining the load, said center bolster further having a slidable and swivelling mounting adapted for connection with the body bolster.

30. A center bolster adapted to be mounted within a truck of the six wheel type having spaced cross bolsters, arms on the center bolster for securing it to said cross bolsters, said center bolster incorporating a slidable and pivotal mounting for a body bolster and also including self-contained side bearing rocker means located inwardly of the truck side frames for cooperation with the body bolster to support the load.

31. In a truck of the six wheel type including side frames and cross bolsters, a center bolster adapted to be secured upon the cross bolsters and having self-contained side bearing rocker means adapted to support a body bolster, and coacting means on the center and body bolsters outwardly of said side bearing rocker means for limiting lateral motion of the body bolster.

32. In a six wheel truck, side frames, cross bolsters connecting the same, a center bolster secured upon said cross bolsters, a body bolster having a depending trunnion, means on the center bolster cooperating with said trunnion to guide the body bolster upon lateral motion thereof, side bearing rocker means interposed between the center bolster and body bolster, and coacting stops on the center bolster and body bolster outwardly of said side bearing rocker means for limiting the lateral motion of the body bolster.

33. A six wheel car truck of the lateral motion type comprising connected side frames, rigid supporting stirrups depending from the side frames, spring means carried by said stirrups, cross bolsters mounted on said spring means and incapable of lateral motion, a center bolster disposed between said cross bolsters and having laterally projecting portions secured thereto, said center bolster having pockets containing side bearing rockers, and a slidable support on the center bearing adapted for rotatably receiving a trunnion element depending from a body bolster adapted to be supported upon said rockers.

34. A six wheel car truck comprising connected side frames, rigid supporting stirrups depending therefrom, spring means mounted on said stirrups, a pair of spaced cross bolsters mounted on said spring means, means for preventing lateral motion of said cross bolsters, a center bolster located between said cross bolsters, said center bolster having pockets containing side bearing rockers, a slidable bearing on the center bolster, in combination with a body bolster having a depending trunnion element rotatably received within said slidable bearing and further having depending bearing elements for cooperation with said rockers.

35. In a railway car truck, a frame including a pair of spaced cross bolsters, a center bolster located between and connected with said cross bolsters, spring means supporting the assembled bolsters, a body bolster located above and rotatably and slidably guided upon said center bolster, and side bearing rockers interposed between the center bolster and the body bolster.

36. In a railway car truck, side frames, a pair of spaced cross bolsters extending between said side frames and restrained thereby against lateral motion but capable of vertical movement, a center bolster located between and rigidly secured to said cross bolster, spring means supporting all of said bolsters as an assembly, means on said center bolster for rotatably and slidably guiding a body bolster, and side bearing rockers carried by said center bolster and adapted to support the body bolster.

37. In a railway car truck, side frames, a pair of spaced cross bolsters extending between said side frames and restrained thereby against lateral motion but capable of vertical movement, a center bolster located between and rigidly secured to said cross bolsters, spring means supporting all of said bolsters as an assembly, means on said center bolster for rotatably and slidably guiding a body bolster, side bearing rockers carried by said center bolster and adapted to support the body bolster, the body bolster being capable of lateral motion, and means on the center bolster adapted to cooperate with means on the body bolster for limiting lateral motion of the latter.

38. A center bolster having laterally extending arms adapted to be mounted upon spaced cross bolsters forming part of a truck, bearing means mounted centrally of said center bolster and adapted to rotatably and slidably guide a body bolster, and side bearing rockers mounted within the end portions of said center bolster and adapted to support the body bolster.

PERCY R. DRENNING.